United States Patent [19]

Kimmel

[11] 4,038,873
[45] Aug. 2, 1977

[54] TEMPERATURE MONITOR AND INDICATOR

[75] Inventor: Elias Kimmel, Great Neck, N.Y.

[73] Assignee: Big Three Industries, Inc. (Tempil Div.), S. Plainfield, N.J.

[21] Appl. No.: 588,050

[22] Filed: June 18, 1975

[51] Int. Cl.$^2$ .................... G01K 11/06; G01K 11/12
[52] U.S. Cl. .................................. 73/358; 116/114 V
[58] Field of Search ............ 73/356, 358; 116/114 V; 252/408

[56] References Cited

U.S. PATENT DOCUMENTS

| | | | |
|---|---|---|---|
| 2,379,459 | 7/1945 | Schreiber et al. | 73/358 |
| 2,799,167 | 7/1957 | Loconti | 73/356 |
| 2,850,393 | 9/1958 | Romito | 116/114 V |
| 3,046,786 | 7/1962 | Tessem | 73/356 |
| 3,243,303 | 3/1966 | Johnson | 116/114 V X |
| 3,420,205 | 1/1969 | Morison | 116/114 V |
| 3,479,877 | 11/1969 | Allen et al. | 73/358 |
| 3,828,612 | 8/1974 | Erikkson et al. | 73/356 |
| 3,954,011 | 5/1976 | Manske | 116/114 V X |

Primary Examiner—Charles A. Ruehl
Attorney, Agent, or Firm—Daniel H. Bobis

[57] ABSTRACT

A time/temperature device for monitoring and indicating variations in the ambient temperature of a space being monitored above a predetermined temperature level is encapsulated in a plastic bag, and uses a carrier to be impregnated with a fusible diffusing medium having a sharp melting point at the predetermined temperature being monitored adapted above the melting point to change from the solid phase to substantially the molten or liquid phase and vice versa below the melting point, a dye composition is formed into a mixture in a given concentration so that it can be coated at one end of the carrier, and the concentration will be in ratio to the volume of the diffusing medium so that the dye composition has a finite and reproducible diffusion rate through the diffusing medium whenever the diffusing medium is in the liquid state and exhibits no diffusion when the diffusing medium is in the solid state, and an indicating section on the face of the carrier for the time/temperature device will provide a visible measurement of the time period of days or weeks over which diffusion of the dye occurs.

20 Claims, 9 Drawing Figures

U.S. Patent    Aug. 2, 1977    4,038,873
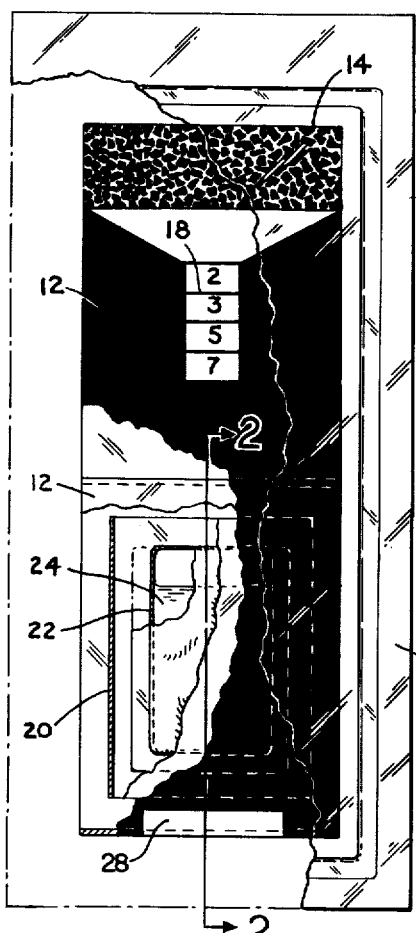
FIG. 1
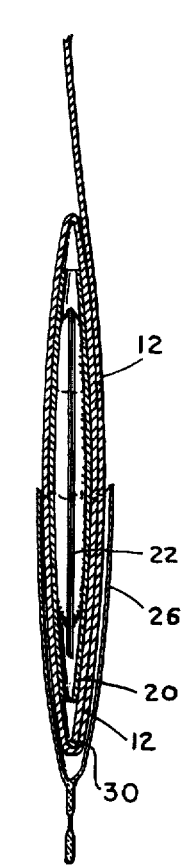
FIG. 2
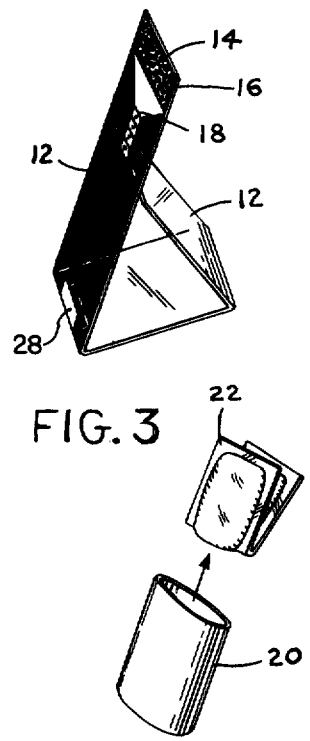
FIG. 3
FIG. 3a
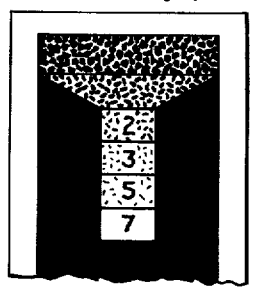
FIG. 4a
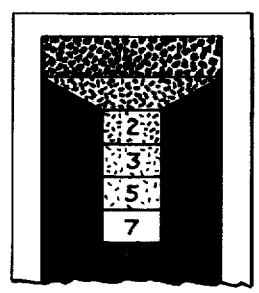
FIG. 4b
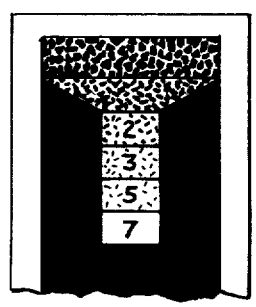
FIG. 4c
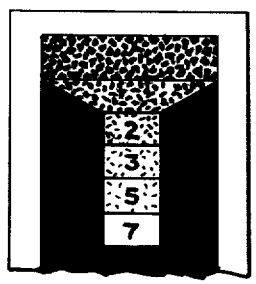
FIG. 4d
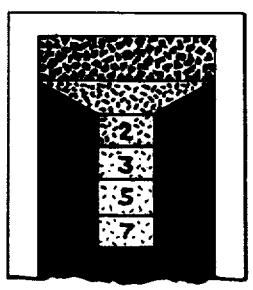
FIG. 4e

TEMPERATURE MONITOR AND INDICATOR

BACKGROUND OF THE INVENTION

This invention relates to a time/temperature monitoring and indicating device that indicates the length of time that such device has been exposed to temperatures above a predetermined temperature level. More particularly, the invention relates to a monitoring and indicating device for indicating by a dye-diffusion mechanism the length of time that frozen food packages, frozen food storage facilities and space or other temperature controlled products, devices or apparatus, has been exposed to undesirable temperature levels for critical periods of time. Utilizing this mechanism, the device graphically displays the storage and handling time/temperature history of frozen food packages subjected to any such thermal abuse.

In the past, many frozen food defrost indicators have been produced, but in general no or inadequate time/-temperature history was provided. Among early attempts to provide time/temperature histories were some devices having time-delay intervals before triggering visible indicators. Usually such time delays were of very short duration, and consequently positive indications of excessive exposure to undesirable temperature levels were not significant and did not necessarily correlate with the quality of frozen foods offered. These devices largely were of the type which delayed delivery of a solvent to the indication site by various wicking techniques, including the wicking of solvent through a constricted passageway. Time delays afforded thereby were on the order of several minutes to a few hours.

The requirements for such time/temperature history indicators arises as each package or case-lot of frozen food presents a complex physical/chemical system that goes through subtle changes upon exposure to excessive temperature levels before becoming unusable. In some frozen foods, the changes are reversible as they represent for example, no enzymatic degradation or crystal restructuring upon refreezing. In some foods, notably beef, shellfish and ice cream, flavor and texture are affected by undesirable temperature levels and such changes are irreversible.

To reduce the risk of unwittingly selling spoiled frozen foods, various indicators have been developed which yield the respective history of refrigeration or the intactness of the cold temperature storage, so far as may be indicated by deformation or by changes in color. However, such indicators frequently have been insufficient in the time aspect as some foods experience subtle changes only after several days at a specific temperature level.

Some chemically or physically reacting indicators are known which indicate any change in the condition of the goods resulting from temperature rises by the indicators changing their shape or color or by bursting. The known indicators have the additional disadvantage that their manufacture, storage, or application to frozen foods is too complicated, or that the readings provided thereby are not sufficiently reliable, or that they cannot be manufactured at a price in keeping with the value of the goods to be protected.

The main advantage of the device of this invention is that a time/temperature indication system is provided whereby an indication of time at a pedetermined temperature is obtained by a unique dye-diffusion mechanism which permits the measurement of time periods, above a predetermined critical temperature, of days or weeks, instead of minutes or hours, as will be described in more detail below.

SUMMARY OF THE INVENTION

Thus, the present invention convers a time/temperature monitor and indicating device for providing a time history for a monitored space above a predetermined temperature which includes; carrier means formed from a sheet of porous material having indicating means thereon, dye composition coated on the carrier adjacent the indicating means, a diffusing medium having a sharp melting point at the predetermined monitoring temperature, porous means for holding said diffusing medium in said carrier means for operative association and impregnation of the carrier when the porous means is activated to release the diffusing medium, said dye composition disposed to diffuse through said diffusing medium whenever the diffusing medium is above its melting point and to provide a color indicator on said indicating means on the carrier as a funtion of the rate of diffusion of said dye through said diffusing medium, and clear envelope means disposed to surround and seal the carrier means and porous means in assembled relation.

OBJECT AND ADVANTAGES

It is an object of the present invention to provide an improved time/temperature monitoring and indicating device based on a dye-diffusion mechanism which is simple to operate and relatively inexpensive.

An additional object is to provide a time/temperature indicator in which the elements for performing the required process steps can be raised to suit the circumstances of use and the requirements of the conditions of service.

A further object is to provide an indicator providing information about how long the product has been held at temperature higher than the predetermined temperature level being monitored.

A feature of the present invention is the dye-diffusion mechanism providing progressive indication of time held at or above a predetermined temperature level of days or weeks.

Another feature of the present invention is a positionable viewing window which may be used to mask the progress of the indicator dye diffusion until such progress would represent a time/temperature experience which is harmful to the product being monitored.

An additional feature is that the diffusing means is initially provided in a rupturable container thereby resulting in an indicator without any shelf-life limitations.

Other objects and advantages of the invention including the basic design and the nature of the improvements thereon will appear from the following description taken in conjunction with the accompanying drawings, in which:

FIG. 1 is a front view of a temperature monitoring and indicating device in accordance with the present invention partly broken away to show a plan view of the elements.

FIG. 2 is an enlarged cross-section of the diffusion device inside the carrier of the temperature monitoring and indicating device shown in FIG. 1.

FIG. 3 is an exploded, perspective view of the carrier and diffusion device of the temperature monitoring and indicating device shown in FIG. 1.

FIG. 4a shows a front view of the temperature monitoring and indicating device shown in FIG. 1 with the dye beginning to diffuse through the diffusing medium impregnated in the carrier.

FIG. 4b shows a front view of the temperature monitoring and indicating device shown in FIG. 4a with the dye through Indicating Box 2.

FIG. 4c shows a front view of the temperature monitoring and indicating device shown in FIG. 4a with the dye through Indicating Box 3.

FIG. 4d shows a front view of the temperature monitoring and indicating device shown in FIG. 4a with the dye through Indicating Box 5, and FIG. 4e shows a front view of the temperature monitoring and indicating device shown in FIG. 4a with the dye through Indicating Box 7.

In the prior art devices operation depends generally on a "wicking" principle. In substance the solvent and the dye are mixed and then by capilliary action expand through a porous carrier to indicate the time/temperature history for the food product or space being monitored at the predetermined temperature.

In the present invention the operative of the device differs in that at the inception a selected solvent is caused to saturate the entire carrier and by diffusion the dye migrates through the solvent during all periods when the solvent is in the melt or liquid stage.

When the solvent or diffusing medium enters the change of state from solid to melt or liquid, then at the inital point where the solid dye contacts the melted diffusion medium there is formed an interface. At such interface the dye will be urged from the area of higher concentration of the area of lower concentration in the solvent or diffusing medium.

As the dye migrates through the solvent or diffusing medium at any given cross-section thereof a like process will be occuring whenever the diffusing medium is in the melt or liquid state; namely that the dye will travel from the area of higher concentration to the area of lower concentration. Thus the dye will progressivley advance through the solvent or diffusing medium as a function of the rate of exchange at any gradient of concentration of the dye either at the initial interface or at any cross-section spaced from said interface.

Migration or spread of the dye through the solvent or diffusing medium from any area of high concentration to an area of lesser concentration will be at a substantially constant or uniform rate depending on the initial concentration of the dye. This concentration gradient will provide a history for the time the solvent is in the melt stage at the temperature being monitored.

The concentration of the dye compounds is selected in a ratio to the volume of the solvent or diffusion medium so the rate of diffusion of the dye in the solvent will be finite and controllable.

Thus, the present invention describes a temperature monitor and indicator having a visible indication thereon which is obtained by the effect of a dye diffusion mechanism to show the time a frozen food package or a storage space etc. is at a given temperature condition in excess of a predetermined temperature being monitored.

With this mechanism measurements on the order of days or weeks rather than hours are obtained.

In the device absorption of a diffusion medium by a carrier thereon merely sets up the proper conditions for diffusion of a dye type indicating material when the temperature being monitored is exceeded.

In the present invention unless the diffusion process is well underway, the calibrated visual indicating display remains negative until a positive indicating position is accumulated to show the length of time at which the item or space being monitored has been exposed to the undesirable pre-existing condition above the specific temperature condition being monitored.

Also, an indicator window, printed a predetermined distance from the dye composition coating, displays an indicating color when the dye has diffused through the molten diffusing medium sufficiently far to have reached the window. This time delay before indication occurs can be varied by changing the distance between the indicator window and the dye coating; the longer the distance, the greater the time delay.

Progress of the dye border can be masked by overprinting the paper carrier so that there is no observable color change until a predetermined period of time has elapsed. Alternatively, a corridor may be printed on the paper carrier so that continuous observations of time, as related to the progress of the dye border, can be made.

If fusible materials are chosen which have little tendency to super cool below their melting points, cooling to the change-of-state temperature or below will freeze them. By keeping the quantity of fusible material below a predetermined amount (compared to the volume of paper carrier) the dye-diffusion mechanism will stop each time the fusible material is cooled below and thereby refrozen.

The device of this invention consists of a paper carrier printed (standard black printing ink) with appropriate windows and folded to form a container for a frangible plastic pouch and sleeve containing the fusible material or diffusing medium. The paper carrier, containing the fusible material pouch is placed within a clear plastic envelope and hermetically sealed to form the complete indicator unit.

Beside the indication "window", there is a printed "activation" window through which rapid diffusion of a dye (coated behind the window) signals to an observer that the unit has actually been activated as is described below.

The signaling dye is coated on the carrier an appropriate distance from the indicator window.

According to the preferred embodiment of the present invention, the temperature monitoring and indicating device 10 FIG. 1, includes a carrier 12 constructed from a sheet of porous material such as filter paper or similar unglazed, uniformly structured paper. The carrier 12 is formed into the folded structure shown in cross-section in FIG. 2 and in perspective in FIG. 3.

For descriptive purposes, the openings to the right and left are considered the sides, and the top of the single thickness of carrier 12 is considered the upper edge 14. The surface area of carrier 12 adjacent upper edge 14 is coated with a dye composition 16, and imprinted on the surface area of carrier 12 adjacent the dye composition 16 is an indicator 18. In the example shown, the indicator 18 is shown as a calibrated scale marking the number of days of dye diffusion. The preparation of the dye composition for coating the carrier is described in the detailed example below.

The carrier is arranged to hold a porous sleeve 20 having therein a frangible package 22 of organic compounds or diffusing medium 24. In preparing the examples of this invention, organic compounds having sharp melting points have been selected. In the illustrated embodiment the open ends of sleeve 20 are lodged in the folds of carrier 12 so that if package 22 is broken prior to melting of the solvent the dry solvent is effectively contained in a clear envelope 26. The edges of the envelope are sufficiently close to the device to hold the various parts in assembled relation. The activation window is shown at 28 and the carrier 12 will be coated on the back thereof as at 30 with a rapid diffusion type dye so as to promptly signal that the diffusing medium 24 has saturated the carrier 12.

The following examples illustrate particular conditions, steps and materials within the scope of this invention, it being understood that these examples are given only by way of illustration and not limitation.

EXAMPLE 1 10° F UNIT

A dye coating mixture consisting of the following:
10 grams of Oil Red Color Index No. 258
8 grams of methyl cellulose
200 cc of water
was placed in a pebble mill, and turned for 24 hours until the mixture was smooth.

The dye coating mixture was painted on one end of the carrier for a temperature monitoring and indicating device in accordance with the present invention in a thickness on each side of about 0.006 inch (6 mils). The thickness is not critical and should not be a limitation to the patent.

0.6 ml. of $n$-tetradecene-1, M.P. 10° F ($-12.2°$ C) was placed in a Tedlar bag 40 × 15 mm. and the bag was placed in the carrier which was folded into the proper shape and in turn placed in an outside plastic envelope. The plastic envelope was sealed to make a temperature monitoring and indicating device in accordance with the present invention.

This temperature monitoring and indicating device was then activated by applying pressure to an breaking the seal of the inner Tedlar bag, and the entire unit was placed in a thermostatic bath at 10.5° ± 0.2° F.

After 48 hours the characteristic red color of the dye had moved ⅛ of an inch and reached Indicator Box 2 on the carrier.

After 72 hours the red color had progressed another ⅛ of an inch to Indicator Box 3.

After 120 hours the red color had penetrated another ⅛ of an inch of Indicator Box 5.

After 168 hours the red color had penetrated another ⅛ of an inch through Indicator Box 7.

After 216 hours the red color had penetrated another ⅛ of an inch through Indicator Box 7 and all boxes were substantially uniformly coated with the red dye color.

It was concluded that this combination of dye and diffusion agent took 7 days to travel about ⅝ of an inch.

EXAMPLE 2 42° F UNIT

A dye coating mixture consisting of the following:
20 grams of Color Index Solvent Blue 16
8 grams of methyl cellulose
200 cc of water
was placed in a pebble mill, and turned for 24 hours until the mixture was smooth.

This dye coating mixture was painted on one end of the carrier for a temperature monitoring and indicating device in accordance with the present invention in a thickness on each side of about 0.006 inch (6 mils).

0.6 M.L. of $n$-tetradecane, M.P. 42° F (5.5° C) was placed in a Tedlar Bag 40 mm × 15 mm and the bag was placed in the carrier which was folded into the proper shape and in turn placed in an outside plastic envelope. The plastic envelope was sealed to make a temperature monitoring and indicating device in accordance with the present invention.

This temperature invention monitoring and indicating device was then activated and the entire unit was placed in a Thermostatic bath at 42.5° ± 0.2° F.

After 48 hours the characteristic blue color of the dye had moved ⅛ of an inch and through Indicator Box 2 on the carrier.

After 72 hours the blue color had progressed another ⅛ of an inch through Indicator Box 3.

After 96 hours the blue color had penetrated another ⅛ of an inch through Indicator Box 5.

After 168 hours the blue color had penetrated another ⅛ of an inch through Indicator Box 7.

It was concluded that this combination of dye and diffusion agent took 4 days to travel about ⅝ of an inch.

EXAMPLE 3 42° F UNIT

A dye coating mixtue consisting of the following:
20 grams of Oil Red B— Color Index Solvent Red 26
8 grams of methyl cellulose
210 cc of water
was placed in a pebble mill, and turned for 24 hours until smooth.

This dye coating mixture was painted on one end of the carrier for a temperature monitoring and indicating device in accordance with the present invention in a thickness on each side of about 0.006 inch (6 mils).

0.6 m.l. of $n$-tetradecane, M.P. 42° F (5.5° C) was placed in a Tedlar bag 40 mm × 15 mm and the bag was placed in the carrier which was folded into the proper shape and in turn placed in an outside plastic envelope. The plastic envelope was sealed to make a temperature monitoring and indicating device in accordance with the present invention.

This temperature monitoring and indicating device was then activated and the entire unit was placed in a thermostatic bath at 42.5° ± 0.2° F.

After 48 hours the characteristic red color of the dye had moved ⅛ of an inch and reached Indicator Box 2 on the carrier.

After 72 hours the red color had progressed another ⅛ of an inch through Indicator Box 2.

After 96 hours the red color had penetrated another 1/16 of an inch through one-half of Indicator Box 3.

After 168 hours the red color had penetrated another 1/16 of an inch through Indicator Box 3.

After 216 hours the red color had penetrated another ⅛ of an inch through Indicator Box 5.

After 264 hours the red color had penetrated another 1/16 of an inch through one-half of Indicator Box 7.

After 336 hours the red color had penetrated another 1/16 of an inch through Indicator Box 7.

It was concluded that this combination of dye and diffusion medium took 14 days to travel ⅝ of an inch. This combination travelled very slowly.

EXAMPLE 4 20° F UNIT

A dye coating mixture consisting of the following:
20 grams of Calcogas Rocket Red — (Diazo Dye—Color Index Solvent Red 26)
8 grams of methyl cellulose
200 cc of water
was placed in a pebble mill, and turned for 24 hours until the mixture was smooth.

This dye coating mixture was painted on one end of the carrier for a temperature monitoring and indicating device in accordance with the present invention in a thickness on each side of about 0.006 inch (6 mils).

0.5 ml. of n-tridecane, M.P. 20° F (−6.7° C) was placed in a Tedlar bag 40 mm × 15 mm and the bag was placed in the carier which was folded into the proper shape and in turn placed in an outside plastic envelope. The plastic envelope was sealed to make a temperatue monitoring and indicating device in accordance with the present invention.

The temperature monitoring and indicating device was then activated and the entire unit was placed in a thermostatic bath at 21.0° ± 0.2° F.

After 48 hours the characteristic red color of the dye had moved ¼ of an inch and reached Indicator Box 2 on the carrier.

After 72 hours the red color had progressed another ⅛ of an inch and reached Indicator Box 3.

After 120 hours the red color had penetrated another ⅛ of an inch and reached Indicator Box 5.

After 168 hours the red color had penetrated another ⅛ of an inch and reached Indicator Box 7.

After 216 hous the red color had penetrated another ⅛ of an inch and was through Indicator Box 7.

It was concluded that this combination of dye and diffusion agent took nine days to travel about ¾ of an inch.

EXAMPLE 5 65° F UNIT

A dye coating mixture consisting of the following:
20 grams of Calcogas Rocket Red
8 grams of methyl cellulose
200 cc of water
was placed in a pebble mill, and turned for 24 hours until the mixture was smooth.

This dye coating mixture was painted on one end of the carrier for a temperature monitoring and indicating device in accordance with the present invention in a thickness on each side of about 0.006 inch (6mils).

0.6 ml. of n-octadecene-1, M.P. 65° F (28.0° C) was placed in a Tedlar bag 40 mm times 15 mm and the bag was placed into the proper shape and in turn was placed in an outside plastic envelope. The plastic envelope was sealed to make a temperature monitoring and indicating device in accordance with the present invention.

This temperature monitoring and indicating device was then activated and the entire unit was placed in a thermostatic bath at 66.0° ± 0.2° F.

After 48 hours the characteristic red color of the dye had moved ¼ of an inch and reached Indicator Box 2 on the carrier.

After 72 hours the red color had progressed another ⅛ of an inch and reached Indicator Box 3.

After 96 hours the red color had penetrated another ⅛ of an inch and reached Indicator Box 5.

After 120 hours the red color had penetrated another ¼ of an inch through Indicator Box 7.

It was concluded that this combination of dye and diffusion agent took five days to travel about ¾ of an inch.

While in the above examples several distinct organic solvents have been employed. The following list of normal saturated hydrocarbons and normal alkenes have been found applicable:

| Name | Formula | Melting Point (° C) |
|---|---|---|
| n-tridecane | $C_{13}H_{28}$ | −6.7 (20° F) |
| n-tetradecane | $C_{14}H_{30}$ | 5.5 (42° F) |

-continued

| Name | Formula | Melting Point (° C) |
|---|---|---|
| n-pentadecane | $C_{15}H_{32}$ | 10.0 |
| n-hexadecane | $C_{16}H_{34}$ | 18.9 |
| n-heptadecane | $C_{17}H_{36}$ | 22.0 |
| n-octadecane | $C_{18}H_{38}$ | 28.0 (65° F) |
| n-tetradecene-1 | $C_{14}H_{28}$ | −12.2 (10° F) |
| n-pentadencene | $C_{15}H_{30}$ | −3.7 |
| n-hexedecene-1 | $C_{16}H_{32}$ | 4.1 |
| n-heptadecene-1 | $C_{17}H_{34}$ | 11.2 |
| n-octadecene-1 | $C_{18}H_{36}$ | 18.3 |

For the sharpest melting point, a compound in a single isomeric form is employed. The above listing is illustrative of compounds available in the desired from, but is not exhaustive and, as a practical matter, any organic compound supporting controlled diffusion and having the desired sharp melting may be used.

The weight of the organic solvent or diffusing medium is preferably selected so that it saturates the carrier without producing an excess that might form a free body of liquid in the plastic holder or clear envelope 26 when the organic solvent or diffusing medium is above its melting point.

Representative ranges for the 10° F unit show the following ranges for these ratios by weight.

| Weight of Diffusing Med | | Weight of Carrier |
|---|---|---|
| .77 grams | (1 ML) Tetradecene to (app. 1 to 1 ratio) | 1.05 grams |
| .54 grams | (.7 ML) Tetradecene to (app. 1 to 2 ratio | 1.05 grams |
| .23 grams | (.3 ML) Tetradecene to (app. 1 to 5 ratio) | 1.05 grams |

The optimum was found to be the to 2 ratio as above illustrated.

These ratios were found to also apply to the other examples above illustrated.

The dye materials or pigment compositions which coact with the organic solvents are generally from groups of Diazo and anthraquinone compounds.

Representative of these are the following:

| Trade Identification | Color Index | Type |
|---|---|---|
| Calcogas Rocket Red | Color Index Solvent Red 26 | Diazo |
| Oil Red B | Color Index Solvent Red 26 | Diazo |
| Oil Scarlet 6G | Color Index Solvent Red No. 258 | Diazo |
| Plastic Blue RDA | Color Index Solvent Blue 16 | Anthraquinnone |

In operation, the indicator stored at ambient temperatures is first placed on a hard, flat surface face up. Then pressing on the face of the indicator with the palm of the hand is sufficient to rupture the pouch containing the fusible material and activate the unit. Allowing the unit to lie flat in this position for two minutes ensures proper drainage of the fusible material from the pouch and absorption of the material to the "activation" window. Cooling the indicator of 0° F will freeze the fusible material and "stop the clock"; i.e. prevent diffusion of the dye. The activated indicator should be cooled to below the melting point of the solvent within 10–20 minutes to ensure the most consistent results.

Unactivated, the indicator unit can be stored indefinitely long at ambient temperatures.

After activation, the signalling mechanism will start each time the indicator is warmed up to its signal temperature (and the fusible material becomes liquid) and will show a signal color at the "indication window" after a predetermined period of time has elapsed. This period of time may be as short as several days or as long as several weeks.

This signalling will stop whenever cooled to 10° below the melting point of the diffusing medium at which point the diffusing indicators would refreeze and the migration of the dye by diffusion will be arrested. It will remain inactive until again heated to the signal temperature. Upon being reheated to the signal temperature, the signalling mechanism will again start. The signal color will appear at a given point on the indicator when the total time of all the periods at signal temperature is equal to the scheduled time delay.

It will be understood that the invention is not to be limited to the specific construction or arrangement or parts shown but that they may be widely modified within the invention defined by the claims.

What is claimed is:

1. A time/temperature indicator for providing a time history of a monitored space above a predetermined temperature comprising:
   a. carrier means formed from a sheet of porous material having, longitudinally extending indicating means thereon,
   b. a dye composition coated on the carrier adjacent said indicating means,
   c. a diffusing medium having a sharp melting point at the predetermined monitoring temperature,
   d. holder means connected to said carrier means for maintaining the diffusing medium inactive and disposed to substantially full impregnate the carrier means initially with diffusing medium when the holder means is activated for use,
   e. said dye composition to diffuse through said diffusing medium as a function of the rate of transfer of said dye composition in the diffusing medium whenever the diffusing medium is above its melting point to provide progressive coloration along said indicating means on the carrier means as an irreversible record of the time said time/temperature indicator is exposed to temperature in excess of said predetermined monitored temperature, and
   f. clear envelope means disposed to surround and seal the carrier means and holder means in assembled relation.

2. A time/temperature indicator as claimed in claim 1, wherein said holder means comprises, a frangible container for holding said diffusing medium, and a porous sleeve element disposed about said frangible container for retaining said diffusing medium in said carrier means.

3. A time/temperature indicator as claimed in claim 1, wherein said indicating means comprises a calibrated scale drawn upon the visible surface of said carrier, said scale in spaced relationship to said dye composition whereby a unit time marking of said scale provides a substantially accurate representation of the rate of diffusion of said dye composition through said diffusing medium.

4. A time/temperature indicator as claimed in claim 1 wherein said diffusing medium is a single isomer of an organic compound with a sharp melting point in the range of about −18° to 28° C.

5. A time/temperature indicator as claimed in claim 4, wherein said diffusing medium is a normal hydrocarbon selected from the group consisting of n-tetradecane, n-pentadecane, n-hexadecane, n-heptadecane, n-octadecane, n-tetradecene-1, n-pentadecene-1, n-hexadecene-1, n-heptadecene-1, and n-octadecene-1.

6. A time/temperature indicator as claimed in claim 1 wherein the ratio of the weight of the diffusing medium to the weight of the carrier means is selected so that the diffusing medium will saturate the carrier means and will not form a body of liquid above the melting point of the diffusing medium.

7. A time/temperature indicator as claimed in claim 1 wherein the weight of the diffusing medium to the weight of the carrier means is in a ratio of 1 to 2.

8. A time/temperature indicator as claimed in claim 1 wherein the ratio of the weight of the diffusing medium to the weight of the carrier means does not exceed 1 to 1 and is not less than 1 to 5.

9. A time/temperature indicator as claimed in claim 1 wherein the dye composition is selected from the group consisting of a diazo dye with a color index solvent red No. 26, and a diazo dye with color index solvent red No. 258.

10. A time/temperature indicator as claimed in claim 1 wherein the dye composition is selected from the group consisting of an anthraquinone dye with a color index solvent blue No. 16.

11. A time/temperature indicator as claimed in claim 1 having an activation window disposed a spaced distance from the indicating means, and a rapidly diffusing dye composition coated on said carrier means adjacent the activation window to color said activation window for signalling proper activation of said time/temperature indicator.

12. A time/temperature indicator for use with a frozen food package comprising:
   a. carrier means made of porous material and having longitudinally extending indicating means thereon,
   b. a diffusing medium substantially fully impregnating said carrier means initially, said diffusing medium having a sharp melting point at a predetermined temperature and changing from a solid state to a liquid state whenever said predetermined temperature is exceeded,
   c. a dye composition coating a portion of the surface of said carrier means adjacent said indicating means,
   said dye composition diffusable at a controlled rate through said diffusing medium whenever said diffusing medium is in a liquid state to provide progressive coloration along said indicaing means on the carrier means as an irreversible record of the time said time/temperature indicator is exposed to a temperature in excess of said predetermined temperature at which the diffusing medium is in a liquid state.

13. A time/temperature indicator for use with a frozen food package as claimed in claim 12 wherein said diffusing medium is stored in a rupturable vessel adjacent said carrier means and the time/temperature indicator is activated by rupture of said vessel.

14. A time/temperature indicator for use with a frozen food package as claimed in claim 13, wherein said diffusing medium is present in a quantity which when in a liquid state is absorbed by said carrier means.

15. A time/temperature indicator as claimed in claim 12 wherein said diffusing medium is a single isomer of an organic compound with a sharp melting point in the range of about −8° to 28° F.

16. A time/temperature indicator as claimed in claim 15 wherein said organic compound is a normal hydrocarbon selected from the group consisting of n-tetradecane, n-pentadecane, n-hexadecane, n-heptadecane, n-octadecane, n-tetradecene-1, n-pentadecene-1, n-hexadecene-1, n-heptadecene-1, and n-octadecene-1.

17. A time/temperature indicator as claimed in claim 12 wherein the dye composition is selected from the group consisting of a diazo dye with a color index solvent red No 26, and a diazo dye with color index solvent red No. 258.

18. A time/temperature indicator as claimed in claim 12 wherein the dye composition is selected from the group consisting of an anthraquinone dye with a color index solvent blue No. 16.

19. A time/temperature indicator as claimed in claim 12 wherein said diffusing medium is a single isomer of an organic compound with a sharp melting point in a range of about −18° to 28° C, and the dye composition is selected from the group consisting of a diazo dye with a color index solvent red No. 26; a diazo dye with a color index solvent red No. 258, and anthraquinone dyes with a color index solvent blue No. 16.

20. A time/temperature indicator as claimed in claim 12 having an activation window disposed a spaced distance from the indicating means, and a rapidly diffusing dye composition coated on said carrier means adjacent the activation window to color said activation window for signalling proper activation of said time/ temperature indicator.

* * * * *